US012768257B2

(12) United States Patent
Witka et al.

(10) Patent No.: US 12,768,257 B2
(45) Date of Patent: Oct. 20, 2026

(54) SUBSEA COMPOSITE VESSEL

(71) Applicant: FMC Technologies Do Brasil LTDA, Rio de Janeiro (BR)

(72) Inventors: Anderson Witka, Rio de Janeiro (BR); Gabriel Bissaro Barban, Rio de Janeiro (BR); Alexandre Mathias Brito, Rio de Janeiro (BR); Thiago Daflon Dos Santos, Rio de Janeiro (BR); Loïc Rene Le Bourlegat, Le Pecq (FR)

( * ) Notice: Subject to any disclaimer, the term of this patent is extended or adjusted under 35 U.S.C. 154(b) by 480 days.

(21) Appl. No.: 18/031,327

(22) PCT Filed: Dec. 16, 2020

(86) PCT No.: PCT/IB2020/062071
§ 371 (c)(1),
(2) Date: Apr. 11, 2023

(87) PCT Pub. No.: WO2022/079486
PCT Pub. Date: Apr. 21, 2022

(65) Prior Publication Data
US 2023/0374894 A1 Nov. 23, 2023

(30) Foreign Application Priority Data
Oct. 15, 2020 (WO) .................. PCT/IB2020/059678

(51) Int. Cl.
*E21B 43/00* (2006.01)
*B01D 17/02* (2006.01)
(Continued)

(52) U.S. Cl.
CPC .......... *E21B 43/36* (2013.01); *B01D 17/0214* (2013.01); *B01D 19/0042* (2013.01); *B65D 88/78* (2013.01); *B65D 90/044* (2013.01)

(58) Field of Classification Search
CPC ...... E21B 43/36; E21B 41/0007; E21B 43/01; B01D 17/0214; B01D 19/0042; B01D 19/0036; B65D 88/78; B65D 90/044
(Continued)

(56) References Cited

U.S. PATENT DOCUMENTS 4,634,314 A * 1/1987 Pierce .................. E21B 17/012
405/203
5,624,140 A * 4/1997 Allen ...................... B29C 65/20
285/123.1
(Continued)

FOREIGN PATENT DOCUMENTS

EP 0 664 418 A1 7/1995

*Primary Examiner* — T. Bennett Mckenzie

(57) ABSTRACT

It is described cylindrical subsea vessel (1) for separation of a flow, the vessel (1) comprising first and second longitudinal ends (T,1"), wherein the subsea vessel (1) comprises: —a liner (2); —at least one fluid inlet (3) and one fluid outlet (4, 5) into and out of an inner volume (7) of the vessel (1); —at least one flange (8) connected in one of the longitudinal ends (1', 1"), wherein the at least one flange (8) and the liner (2) form the inner volume of the subsea vessel (1), and wherein the at least one flange (8) comprises at least one through-going opening (4,5,6) forming the at least one fluid inlet (3,4) and/or fluid outlet (5); —a load bearing structure (9) arranged outside the liner (2) and the at least one flange (8), wherein the load bearing structure (9) is of a composite material. It is further described a method of manufacturing the subsea vessel.

8 Claims, 5 Drawing Sheets

(51) Int. Cl.

| | |
|---|---|
| ***B01D 19/00*** | (2006.01) |
| ***B65D 88/78*** | (2006.01) |
| ***B65D 90/04*** | (2006.01) |
| ***E21B 43/36*** | (2006.01) |

(58) Field of Classification Search

USPC .............................................................. 96/182

See application file for complete search history.

(56) References Cited

U.S. PATENT DOCUMENTS

| | | | | |
|---|---|---|---|---|
| 10,633,962 | B2 * | 4/2020 | Sund | B01D 17/0214 |
| 11,713,664 | B2 * | 8/2023 | Moita Witka | B01D 17/12<br>210/188 |
| 2006/0060289 | A1 * | 3/2006 | Carter | F17C 13/025<br>156/187 |
| 2012/0048862 | A1 * | 3/2012 | Otsuka | F17C 1/04<br>428/36.3 |
| 2012/0297621 | A1 * | 11/2012 | Kuo | F24H 1/181<br>156/218 |
| 2012/0325832 | A1 * | 12/2012 | Takeuchi | F17C 1/04<br>220/661 |
| 2018/0161728 | A1 * | 6/2018 | Tateoka | C02F 1/008 |
| 2019/0195428 | A1 * | 6/2019 | Otsubo | F17C 1/02 |
| 2020/0025338 | A1 * | 1/2020 | Petitpas | F17C 5/02 |
| 2020/0271272 | A1 * | 8/2020 | Lee | F17C 1/16 |
| 2020/0306770 | A1 * | 10/2020 | Dehn | B04B 7/18 |

* cited by examiner

SUBSEA COMPOSITE VESSEL

The present invention relates to a subsea vessel comprising a liner connected to at least one flange, and where a load bearing structure of the vessel is of a composite material. The invention further relates to a method of manufacturing said subsea vessel.

BACKGROUND AND PRIOR ART

A Subsea Separation System is designed to separate multiphase fluids on the seabed, sending topside the oil and/or gas streams and reinjecting the undesirable phases like water, carbon dioxide, etc. This separation reduces the topside facilities for separation and treatment of these phases, enabling the increase of the oil production in the field. One of the main components on this kind of system is a separation vessel, which consists essentially in a pressure vessel in which this fluid segregation, by gravitational or cyclonic means, occurs. For example, considering the operational conditions for pre-salt fields, a pressure vessel for this purpose must be long and have a large diameter in order to withstand the elevated production volume, and also be capable to operate under elevated pressure and temperature conditions, in a water depth up to 2500 meters.

A material commonly considered for such kind of pressure vessels construction is steel, since it is a consolidate material in the oil and gas industry with a significantly large knowhow accumulated over the years with equipment engineering, manufacturing and usage. To withstand the required operational conditions for such application, however, a metallic pressure vessel must have a considerably thick wall, which may end up resulting in a product that is costly, heavy and very challenging in terms of sourcing, manufacturing and installation.

It is therefore an objective of the invention to provide an alternative pressure vessel which is lighter without compromising on the strength.

SUMMARY OF THE INVENTION

The present invention is set forth and characterized in the independent claims, while the dependent claims describe other characteristics of the invention.

The invention relates to a composite vessel, which aims to provide an alternative solution for the large conventional metallic pressure vessel, focusing on weight reduction and/or also gain in lead-time and installation costs. This can be possible since composite material presents higher specific strength compared to other materials and relies on an additive manufacturing process.

It is described a cylindrical subsea vessel for separation of a flow, the vessel comprising first and second longitudinal ends, wherein the subsea vessel comprises:

a liner;

at least one fluid inlet and one fluid outlet into and out of an inner volume of the vessel;

at least one flange connected in one of the longitudinal ends, wherein the at least one flange and the liner form the inner volume of the subsea vessel, and wherein the at least one flange comprises at least one through-going opening forming the at least one fluid inlet and/or fluid outlet;

a load bearing structure arranged outside the liner and the at least one flange, wherein the load bearing structure is of a composite material.

The liner and the at least one flange can be made of metal, i.e., the liner can be a metallic liner and the flange can be a metallic flange. Alternatively, the liner and the at least one flange may be a Polyether ether ketone (PEEK) liner or thermoplastic liner suitable for harsh environment. In any case, it may be an advantage that the liner and flange are of the same material or, at least of two materials with similar electric potential, such that they do not degrade each other. The at least one flange can be a hub or other connection interface.

The liner and the at least one flange may form a closed inner volume of the subsea vessel. The only opening(s) into and out of the vessel is via the through-going opening(s) in the flange(s). The liner and the flange(s) perform the functions of containing the processing fluids or the flow as well as protecting chemically the composite material(s) from abrasive or hazardous processing fluids able to degrade the composite material(s).

Since the liner acts as a fluid container, it may be necessary just to have a thin shell, suitable for direct contact with the production fluid, to protect the inner volume, avoiding adding unnecessary weight and cost. However, the liner may also have some load bearing capacity. In any case, although no structural function may be assigned to the liner, a minimum geometrical stability is needed for the liner.

The at least one flange is preferably connected to the liner forming a fluid-tight connection therebetween. Such fluid-tight connection may be obtained by welding, gluing etc, dependent on the materials of the liner and the flange. Once connected, the liner and the at least one flange form a closed inner volume of the subsea vessel. The only access into the inner volume being through the at least one through-going opening in the at least one flange.

The liner and flange(s) form a chemical protection between any fluid within the inner volume and the composite material on the outside of the liner and flange. In order to protect the flange(s), it may have weld overlaid cladding placed on the flange surfaces exposed to the fluid inside the vessel.

The vessel may comprise two flanges, the flanges preferably being connected to the first and second longitudinal ends of the vessel. The preferred option if using two flanges in total is to arrange one flange in each of the longitudinal ends of the subsea vessel.

Alternatively, the vessel may comprise only one flange. If the vessel comprises only one flange, the one flange may comprise a first and a second through-going opening, wherein the first through-going opening forms a fluid inlet and the second through-going opening forms a fluid outlet into and out of the inner volume of the vessel.

In the embodiment of only one flange, an inlet pipe for directing fluid into the subsea vessel may extend from the one flange towards an opposite longitudinal end of the subsea vessel. Thus, in the event the subsea vessel is a separator, instead of having inlet and outlet into and out of the subsea vessel at the opposite ends, the inlet pipe and outlet from the subsea vessel are arranged in the same one flange. The retention time for the fluid in the vessel will be similar to arranging the inlet and outlet at the opposite longitudinal ends provided that the subsea vessels are of the same size and that an outlet of the inlet pipe is at the same position as would be the case if the outlet where in a flange in the opposite end. Preferably, all through-going openings for inlet and/or outlet of fluid into and out of the inner volume of the vessel are arranged in the at least one flange connected to the at least one longitudinal end of the vessel. Arranging all of the through-going openings into and out of the flange(s) ensures that the strength of the subsea vessel is optimized as there are no portions of the composite material that is weakened, i.e., the composite material is continuous without any hole(s) therethrough.

The load bearing structure may carry a majority of, and possibly all, loads. However, other layers of the vessel may carry some of the loads. Then the load bearing structure not necessarily have to carry all loads. The composite material of the load bearing structure may comprise a Carbon Fiber Reinforced Polymer (CFRP). The CFRP may be seen as the core part of the vessel and may be responsible to sustain the majority of loads imposed to the product during its life. The CFRP is a layup of non-twisted continuous fibers, such as for example polyacrylonitrile (PAN) carbon fibers impregnated with polymer which, once winded forming an optimal layup, grant to the vessel and adequate mechanical performance and load bearing capacity. Such polymer may be epoxy, polyester, vinyl ester resin or phenolic.

Alternatively, the composite material of the load bearing structure can be fiberglass, basalt, aramid or other (natural or synthetic) fiber reinforced material. The vessel may further comprise a coating outside the composite material.

The coating may be a thermoplastic coating, thermosetting coating or paint. A thermoplastic coating, i.e., a thermoplastic polymeric external coating, is responsible to act as an absorption barrier and protect the internal layers from minor impacts, direct sunlight, and from the surrounding environment.

The liner may be a metallic liner, the vessel may comprise a galvanic coupling protection for the metallic liner. The galvanic coupling protection may be arranged between the metallic liner and the load bearing structure.

The galvanic coupling protection may be a Glass Fiber Reinforced Polymer (GFRP). The GFRP may be a composite layup of non-twisted continuous glass fiber roving impregnated with polymer, placed between the load bearing material and the liner and flanges, in order to avoid metal parts contact with the carbon fiber layers, aiming to inhibit the formation of a galvanic coupling that could potentially result in galvanic corrosion. Such polymer may be epoxy, polyester or phenolic.

Instead of a Glass Fiber Reinforced Polymer, the galvanic coupling protection may be a basalt, aramid, other (natural or synthetic) fiber, polymeric or ceramic electrical insulation material.

The subsea vessel may further comprise a glass fiber reinforced polymer (GFRP) composite protective shell over the carbon fiber, made from a layup of non-twisted continuous glass fiber roving impregnated with polymer, made to provide protection against impacts and minor damages, as well as to provide additional galvanic insulation between the load bearing structure and external metallic parts. If present, this external protective shell serves as base for external protective polymeric coating. Instead of a fiberglass composite protective shell, basalt, aramid, other natural fibers or polymeric material may be used.

The subsea vessel may further comprise a particulate removal system inside the inner volume. The particulate removal system may comprise:

- a particle movement device for forcing any sedimented particles from the flow into motion;
- a particle removal device for lifting particles from an elevation equal to a position at or close to a bottom of the inner volume and up and out of a fine particulate outlet in the at least one flange.

The particle movement device can be jet nozzles or a spray device suitable for putting sedimented (i.e., gravity separated) particles from the flow towards the particle removal device. Alternatively, the particle movement device can be a screw pump, such as an Archimedes' screw.

The particle removal device may comprise suction means for sucking particles out of the inner volume and up and out through the outlet in the flange. The particle removal device can comprise a fine particulate pipe with an opening at or close to the bottom of the vessel and a second opening outside of the inner volume through the flange. The opening of the pipe inside the inner volume may be conical with the relatively larger cross section of the cone directed against the particles/sediments. This may provide a more efficient suction of the particles than using a pipe with a constant cross section.

The subsea vessel can be a gravitational separation vessel. Gravitational separation vessels are designed to separate the multiphase fluids on the seabed and then send the oil and gas streams with a minimum amount of water either together or using separate lines to the surface for further treatment. Subsea separation key benefit is to reduce capital and operating costs by reducing surface processing needs. The gravitational separation vessels are relatively large structures and can be in the size of 0.5 meter (or more) in diameter, and range from 2 to 25 meters in length. Preferably, the gravitational separation vessel is at least 1.5 meters in diameter and more than 10 meters long. The gravitational separation vessel is preferably of sufficient length for gravitational separation to occur. The degree of separation in a gravitational separator is dependent on the retention time. The retention time in a separator is determined by dividing the liquid volume inside the vessel by the liquid flow rate. The retention time usually varies between 30 seconds and 3 minutes.

As an alternative to gravitational separation vessel, the subsea vessel can be a cyclonic separation vessel comprising cyclonic means for separation.

The subsea vessel can be a slug flow vessel. The term "slug flow" usually refers to heavier, slower moving fluid. Such flow is characterized by the intermittent sequence of liquid slugs followed by longer gas bubbles flowing through a pipe. In order to prevent that such slugs damage subsea equipment, the flow may be guided through the subsea vessel. The flow exiting the subsea vessel is steady, e.g., a laminar flow without liquid slugs.

The subsea vessel can be a mixing or buffering vessel.

The subsea vessel can be a dump vessel.

It is further described a cylindrical subsea vessel having first and second longitudinal ends;

- at least one fluid inlet and one fluid outlet into and out of an inner volume of the vessel;
- at least one flange connected in one of the longitudinal ends, and wherein the at least one flange comprises at least one through-going opening forming the at least one fluid inlet and/or fluid outlet and
- a structure forming the vessel, wherein the structure is of a composite material.

The structure is designed for taking up any expected internal and external loads, and/or any pressure differences between an outside of the vessel and the inner volume of the vessel.

In this embodiment, the vessel can be formed without a liner and the composite material is chosen based on the expected production fluid composition. This may be important in order to prevent that the production fluid react with the composite material thereby degrading or eating away the vessel.

The invention further relates to a method of manufacturing a cylindrical subsea vessel having first and second longitudinal ends, comprising the steps of:

- preparing a liner;
- preparing at least one flange comprising at least one through-going opening forming a fluid inlet or fluid outlet;
- forming a fluid-tight connection between the at least one flange and the liner thereby providing a closed inner volume inside the liner and the at least one flange;
- forming a load bearing structure of a composite material outside the liner and the at least one flange.

The liner and the at least one flange may chemically separate the inner volume from outer composite layer(s).

As indicated above, the composite material may be a layup of non-twisted continuous fibers, such as for example polyacrylonitrile (PAN) carbon fibers impregnated with polymer which, once winded forming an optimal layup, grant to the vessel and adequate mechanical performance and load bearing capacity. Such polymer may be epoxy, polyester or phenolic.

The fluid-tight connection may be formed by welding. However, other alternative connections providing a fluid-tight connection are also possible, such as gluing. The method may further comprise a step of:

- adding an external coating outside the composite material.

A mandrill may be used instead of the liner in the manufacturing. Mandrill may form part of the finished vessel or it may be removed after the vessel has been made. The liner and the flange(s) may also act as a mandrill for a filament winding manufacturing process. In order to perform this function, the liner and flange(s) may have a minimum geometrical stability, or be supported with additional support. As an alternative to filament winding, automated fiber placement, automated tape layup, resin transfer molding (RTM), vacuum assisted resin transfer molding (VARTM), fiber braiding or bladder molding may be used as processing method.

The method may further comprise, after the step of forming the fluid-tight connection, a step of:

- pressurizing the closed inner volume of the subsea vessel. This may be performed such as to withstand external forces from the adding of the external layers added thereto.

The method may further comprise, prior to forming the load bearing structure, the steps of:

- adding an elastomeric sealing layer over the liner and the at least one flange; and
- adding a galvanic coupling protection of a glass fiber reinforced plastic over the elastomeric sealing layer. The galvanic coupling protection may be a galvanic insulation layer.

The elastomeric sealing layer may be a sheet of elastomeric material which is placed over the flanges and liner, aiming to provide a water-tight interface between the liner and the composite layers.

Instead of an elastomeric sealing layer, a polymeric material may be used.

The method may further comprise, prior to adding the external coating, a step of:

- adding a glass fiber reinforced polymer (GFRP) composite protective shell over the load bearing structure.

The relative terms "upper", "lower", "below", "above", "higher" etc. shall be understood in their normal sense and as seen in a cartesian coordinate system. When mentioned in relation to a well, "upper" or "above" shall be understood as a position closer to the surface of the well (relative to another component), contrary to the terms "lower" or "below" which shall be understood as a position further away from the surface of the well (relative another component).

A product with such characteristics is well aligned with the Oil and Gas industry demand, since it seeks the reduction in overall costs, weight and time for first oil production.

BRIEF DESCRIPTION OF THE DRAWINGS

The following drawings are appended to facilitate the understanding of the invention. The drawings show embodiments of the invention, which will now be described by way of example only, where:

FIG. 1A is a view along a longitudinal axis of the subsea vessel, FIG. 1B is a side view of the subsea vessel and FIG. 1C is a perspective view of the subsea vessel;

DETAILED DESCRIPTION OF THE INVENTION

Figure 1A:
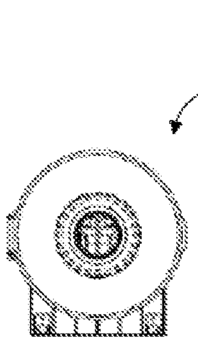
FIGS. 1A, 1B and 1C are examples of a cylindrical subsea vessel according to the invention, where

In the following, embodiments of the invention will be discussed in more detail with reference to the appended drawings. It should be understood, however, that the drawings are not intended to limit the invention to the subject-matter depicted in the drawings.

Figure 1B:
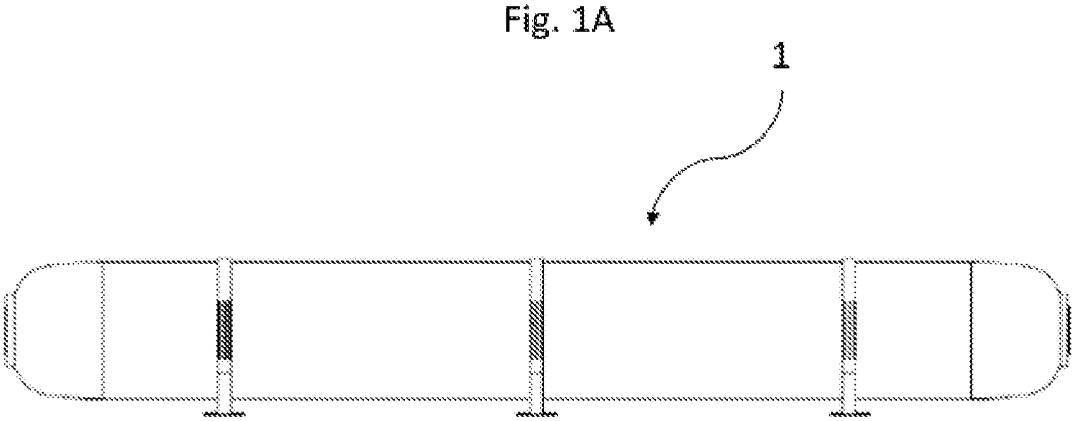
Figure 1C:
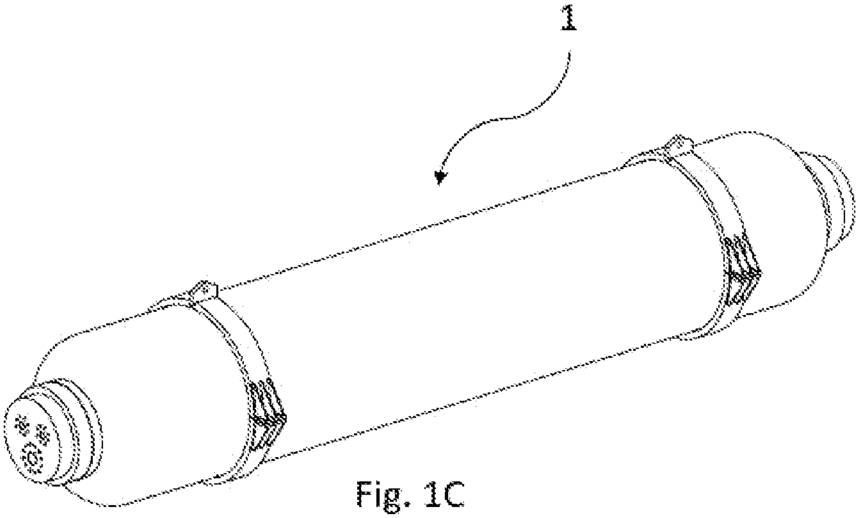

FIGS. 1A,1B and 1C are examples of a cylindrical subsea vessel 1 according to the invention, where FIG. 1A is a view along a longitudinal axis of the subsea vessel, FIG. 1B is a side view of a subsea vessel 1, and FIG. 1C is a perspective view of the subsea vessel 1.

Figure 2:
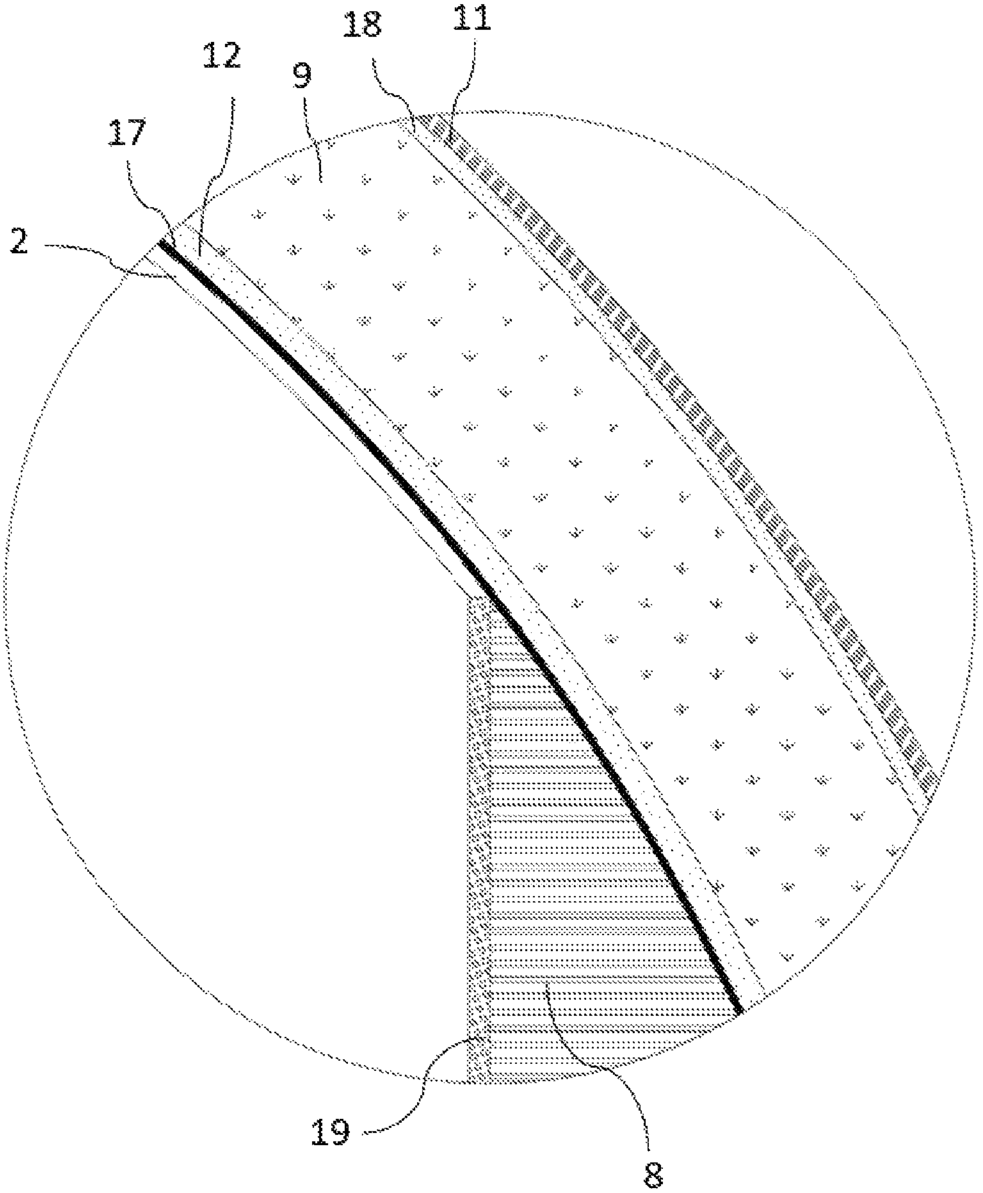
FIG. 2 is a perspective view of details of the different layers in a subsea vessel according to the invention.

FIG. 2 is a perspective view of details of the different layers in a subsea vessel according to the invention. The layers of the disclosed subsea vessel 1 in FIG. 2 are the following, starting from the innermost layer:

- Liner 2 and flange 8. The liner 2 and the flange 8 are connected to each other by a fluid-tight connection, such as by welding or gluing and may be the only structural components of the subsea vessel 1 that are in the contact with the fluid, e.g., production fluid. In order to protect the flange(s) 8, the flange(s) 8 may have weld overlaid cladding 19 placed on the flange surfaces exposed to the fluid inside the vessel.
- An elastomeric sealing layer 17 over the liner 2 and the at least one flange 8.
- A galvanic coupling protection 12 for the liner 2. The galvanic coupling protection 12 may be a Glass Fiber Reinforced Polymer (GFRP).
- A load bearing structure 9. The load bearing structure may be formed of a composite material, such as Carbon Fiber Reinforced Polymer (CFRP).

A glass fiber reinforced polymer (GFRP) composite protective shell 18 over the load bearing structure 9. The shell 18 is preferably made to provide protection against impacts and minor damages, as well as to provide additional galvanic insulation between the load bearing structure 9 and external metallic parts.

An external coating 11.

Figures 3A, 3B:
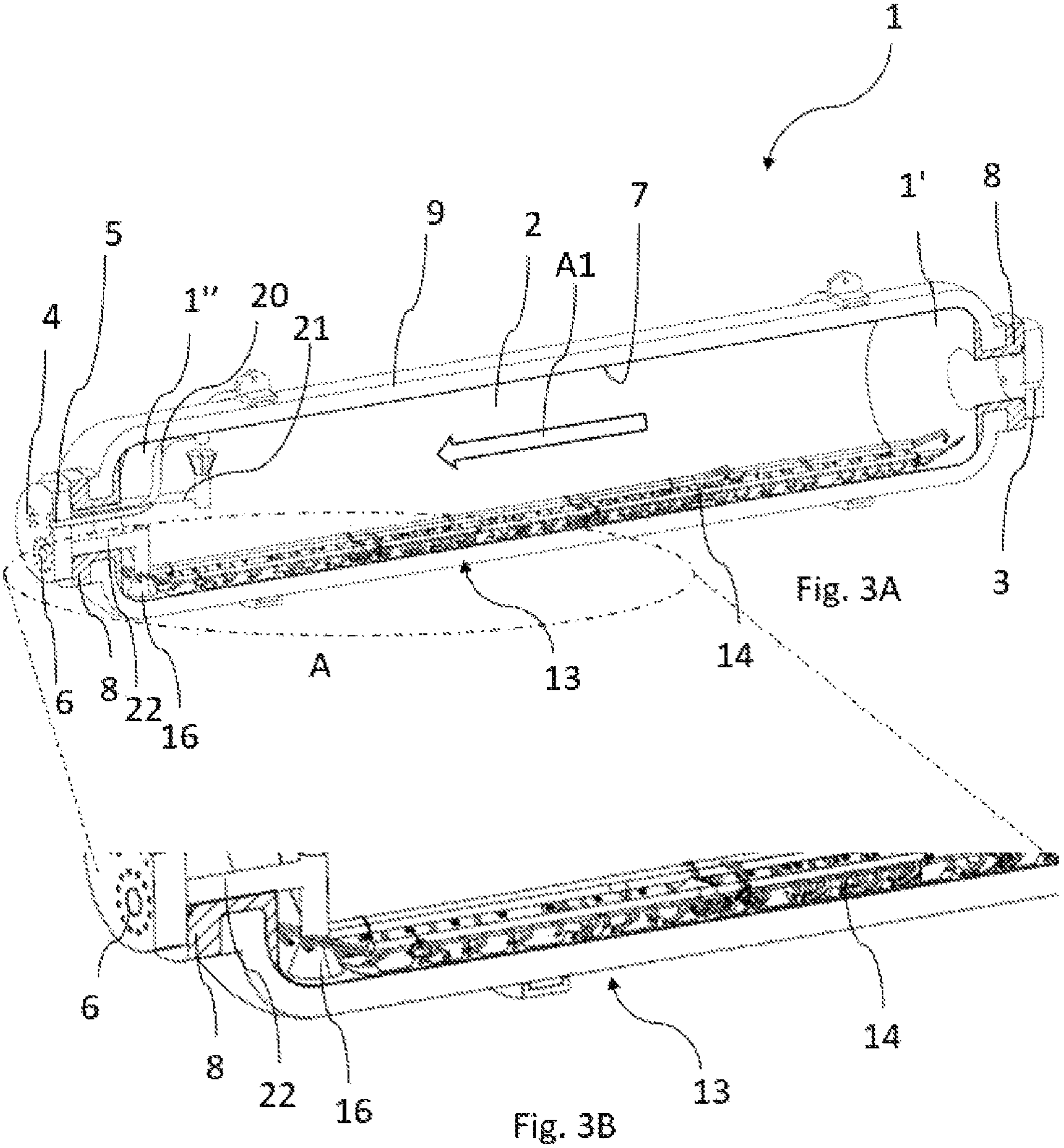
FIG. 3A is a perspective view of an inner volume of a subsea vessel, where the vessel has been cut in a vertical plane along its longitudinal axis.
FIG. 3B is an enlarged view of section A in FIG. 3B, showing details of a particulate removal system which may be arranged inside an inner volume of the subsea vessel.

FIG. 3A is a perspective view of an inner volume 7 of a subsea vessel 1. The vessel 1 in FIG. 3A has been cut in a vertical plane along its longitudinal axis to better illustrate internal devices or components of the subsea vessel 1. The subsea vessel 1 of FIG. 3A discloses a liner 2 extending from the first longitudinal end 1' to the second longitudinal end 1" of the vessel 1. A total of two flanges 8 are shown, the flanges 8 are connected to respective longitudinal ends 1',1" of the vessel 1 forming a fluid tight connection therebetween. The flange 8 connected to the first longitudinal end 1' of the vessel 1 comprises a through-going opening forming a fluid inlet 3 for production fluid into the inner volume 7 of the subsea vessel 1. The arrow A1 inside the inner volume 7 indicates the flow direction inside the subsea vessel 1. The flange 8 connected to the second longitudinal end 1" of the vessel 1 is disclosed with a total of three through-going openings forming a fluid outlet 4 for production fluid, a fluid outlet 5 for gas outlet and a fine particulate outlet 6.

As disclosed in the FIG. 3A, the fluid outlet 5 for gas is connected to a gas pipe 20 inside the subsea vessel 1. As the gas separates higher relative to liquids, the gas pipe 20 has an inlet at a relatively high elevation inside the inner volume 7.

Further, as disclosed in FIG. 3A, the fluid outlet 4 for production fluid is connected to a production fluid pipe 21 inside the subsea vessel 1. The inlet of the production fluid pipe 21 is at a relatively lower elevation compared to the inlet of the gas pipe 20.

The elevation of the inlets of the gas pipe 20 and the fluid production pipe 21 are chosen based on expected well flow composition etc., and can be varied.

It is further disclosed a fine particulate outlet 6. The fine particulate outlet 6 is connected to a fine particulate pipe 22 inside the subsea vessel 1. The fine particulate outlet and fine particulate pipe form part of a particulate removal system 13.

The particulate removal system 13 (which is better illustrated in FIG. 3B) is further disclosed with a particle movement device 14 for forcing any sedimented particles from the flow into motion and towards a particle removal device 16 which is connected to the fine particulate pipe 22 and the fine particulate outlet 6. The particle movement device 14 is disclosed with nozzles connected to a pressure system for jetting the sedimented particles.

The particle removal device 16 is conical with the relatively larger cross section of the cone directed downwards towards the sedimented particles/sediments (which due to their relative higher density than the fluids, will collect at the bottom of the subsea vessel 1). This may provide a more efficient suction of the particles or sediments than using a pipe with a constant cross section.

FIG. 3B is an enlarged view of section A in FIG. 3A, showing details of a particulate removal system 13 which may be arranged inside the inner volume 7 of the subsea vessel 1. The particle movement device 14 is illustrated as nozzles. The nozzles are arranged along substantially the whole length of the subsea vessel, e.g. from the first longitudinal end 1' of the vessel 1 to the second longitudinal end 1" of the vessel 1. The outlets of the nozzles are arranged with a space relative an outlet of a neighboring nozzle.

Figure 4:
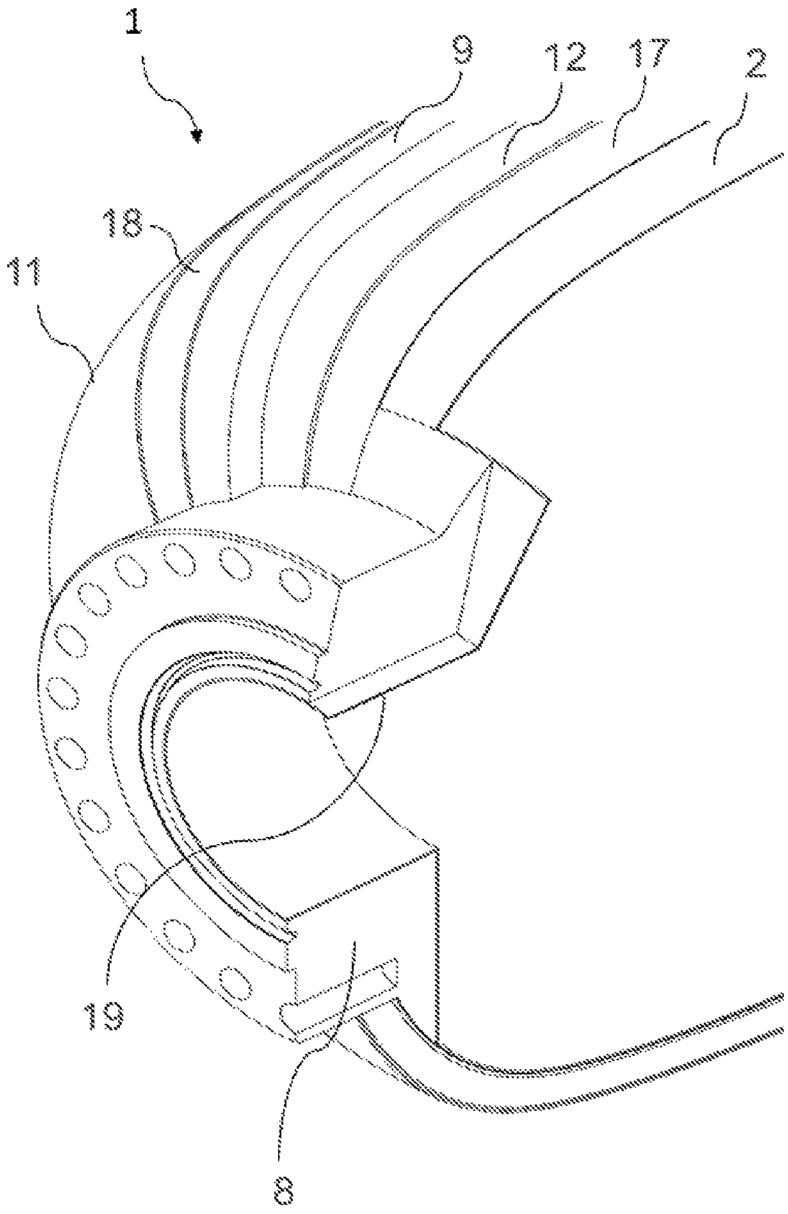
FIG. 4 is a perspective side view of a subsea vessel, indicating different layers forming the subsea vessel.

FIG. 4 is a perspective side view of a subsea vessel 1, indicating different components the subsea vessel 1. The components are similar to the layers described in relation to FIG. 2.

Figure 5:
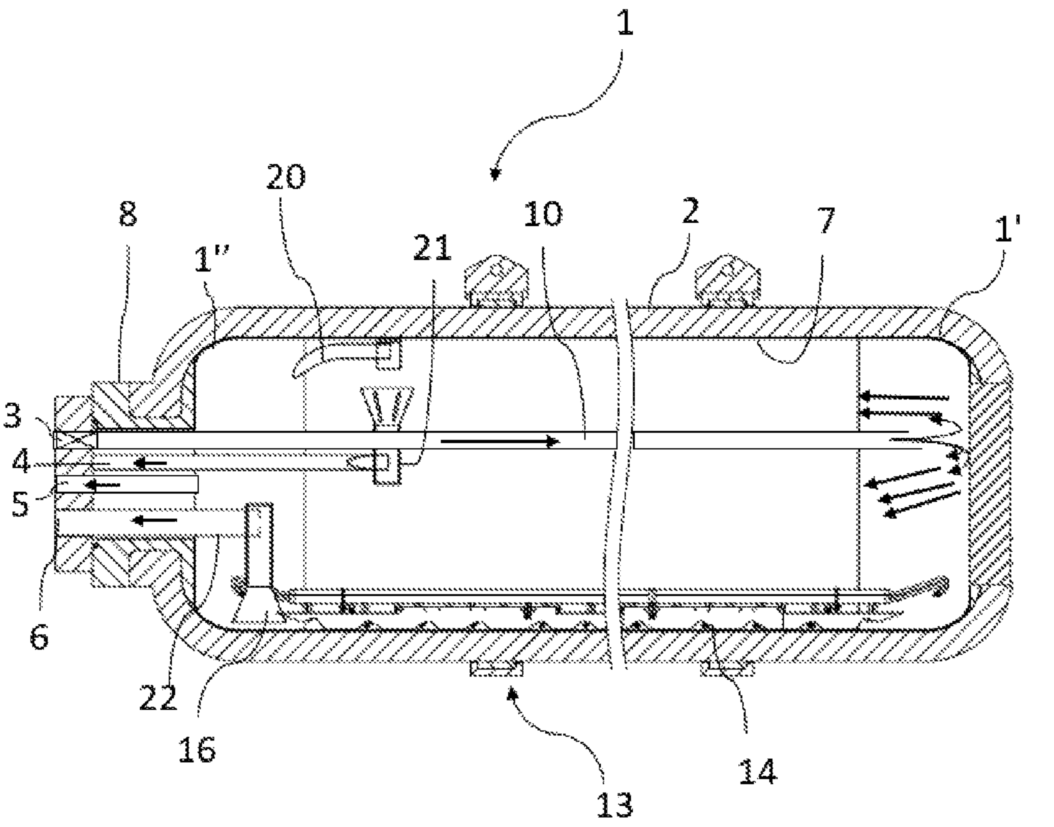
FIG. 5 is a side view of a subsea vessel with only one flange, where all of the fluid inlet(s) and fluid outlet(s) into and out of the subsea vessel are arranged in said one flange.

FIG. 5 is a side view of a subsea vessel 1 with only one flange 8. All of the fluid inlets and outlets 3, 4, 5 i.e. fluid inlet 3 for production fluid, fluid outlet 4 for production outlet and fluid outlet 5 for gas outlet into and out of the inner volume 7 of the subsea vessel 1 are arranged in said one flange 8. In addition, the fine particulate outlet 6 for the fine particles is arranged in the same flange 8. Thus, the flange 8 has through-going openings for the respective inlets and outlets 3, 4, 5, 6 into and out of the inner volume 7 of the subsea vessel 1. A similar particulate removal system 13 comprising particle movement device 14, particle removal device 16 and fine particulate pipe 22 as the system illustrated and described in relation to FIGS. 3A and 3B are arranged inside the inner volume 7 of the subsea vessel 1 and will not be further described. The fluid inlet 3 extending through the flange 8 is connected to an inlet pipe 10. The inlet pipe 10 extends from the one flange 8 arranged at the second longitudinal end 1" of the vessel 1 and to an opposite end of the subsea vessel, i.e. to the first longitudinal end 1' of the vessel 1. This means that production fluid entering via fluid inlet 3 and further to the inlet pipe 10 is discharged from the inlet pipe 10 at the opposite end of the subsea vessel 1 than where the one flange 8 is arranged. The retention time for the fluid in the subsea vessel 1 is similar to arranging the inlet and outlet at the opposite longitudinal ends (as in FIGS. 1-4) provided that the subsea vessels 1 are of the same size and the discharge outlet from the inlet pipe 10 is at or close to the first longitudinal end 1' of the subsea vessel 1.

In the preceding description, various aspects of the subsea vessel according to the invention have been described with reference to the illustrative embodiment. For purposes of explanation, specific numbers, systems and configurations were set forth in order to provide a thorough understanding of the subsea vessel and its workings. However, this description is not intended to be construed in a limiting sense. Various modifications and variations of the illustrative embodiment, as well as other embodiments of the subsea vessel, which are apparent to persons skilled in the art to which the disclosed subject matter pertains, are deemed to lie within the scope of the present invention as defined in the attached claims.

LIST OF REFERENCE NUMBERS

1 Subsea vessel
2 Liner
1',1' First and second longitudinal ends of subsea vessel
3 Fluid inlet
4 Fluid outlet, production fluid outlet
5 Fluid outlet, gas outlet
6 Fine particulate outlet
7 Inner volume of vessel
8 Flange
9 Load bearing structure
10 Inlet pipe
11 Coating
12 Galvanic coupling protection
13 Particulate removal system
14 Particle movement device
16 Particle removal device
17 Elastomeric sealing layer
18 Glass fiber reinforced polymer composite protective shell

19 Flange cladding
20 Gas pipe
21 Fluid production pipe
22 Fine particulate pipe
A Section/enlarged portion
A1 Arrow indicating flow direction

The invention claimed is:

1. A cylindrical subsea vessel for separation of a flow, the vessel comprising:
- first and second longitudinal ends;
- a liner;
- at least one fluid inlet and at least one fluid outlet connected to an inner volume of the vessel;
- at least one flange connected to one of the first and second longitudinal ends, wherein the at least one flange and the liner form the inner volume of the subsea vessel, and wherein the at least one flange comprises at least one through-going opening forming the at least one fluid inlet and/or the at least one fluid outlet; and
- a load bearing structure arranged outside the liner and the at least one flange, wherein the load bearing structure is made of a composite material; and
- wherein the liner and the at least one flange are made of the same metal material;
- wherein the at least one flange comprises only one flange; and
- wherein the one flange comprises a first and a second through-going opening, and wherein the first through-going opening forms the fluid inlet and the second through-going opening forms the fluid outlet.

2. The subsea vessel according to claim 1, further comprising an inlet pipe extending from the one flange towards an opposite longitudinal end of the subsea vessel for directing fluid into the subsea vessel.

3. The subsea vessel according to claim 1, wherein all through-going openings for inlet and/or outlet of fluid into and out of the inner volume of the vessel are arranged in the at least one flange connected to the at least one longitudinal end of the vessel.

4. The subsea vessel according to claim 1, wherein the composite material of the load bearing structure comprises a Carbon Fiber Reinforced Polymer (CFRP).

5. The subsea vessel according to claim 1, wherein the vessel further comprises a coating outside the composite material.

6. The subsea vessel according to claim 5, wherein the coating is a thermoplastic coating.

7. The subsea vessel according to claim 1, wherein the vessel comprises a galvanic coupling protection for the liner, the galvanic coupling protection being arranged between the liner and the load bearing structure.

8. The subsea vessel according to claim 7, wherein the galvanic coupling protection is a Glass Fiber Reinforced Polymer (GFRP).

* * * * *